United States Patent [19]

Duthweiler

[11] Patent Number: 4,676,695

[45] Date of Patent: Jun. 30, 1987

[54] METHOD FOR PREVENTING THAW SETTLEMENT ALONG OFFSHORE ARTIC PIPELINES

[75] Inventor: Frederick C. Duthweiler, Anchorage, Ak.

[73] Assignee: Union Oil Company of California, Los Angeles, Calif.

[21] Appl. No.: 794,120

[22] Filed: Nov. 1, 1985

[51] Int. Cl.[4] .............................................. E03B 7/10
[52] U.S. Cl. .................................. 405/157; 405/131; 405/154
[58] Field of Search ............... 405/154, 157, 158, 169, 405/170, 234, 131, 61; 165/45; 138/145, 149, 175

[56] References Cited

U.S. PATENT DOCUMENTS

| | | | |
|---|---|---|---|
| 3,217,791 | 11/1965 | Long | 165/45 |
| 3,282,301 | 11/1966 | Ligon | 138/175 |
| 3,766,980 | 10/1973 | Kern | 405/131 |
| 3,767,149 | 10/1973 | Hill | 405/157 |
| 4,040,165 | 8/1977 | Miessler et al. | 138/149 |
| 4,271,681 | 6/1981 | Schertz | 165/45 |
| 4,289,172 | 9/1981 | Ekström | 138/149 |
| 4,300,855 | 11/1981 | Watson | 405/61 |
| 4,553,879 | 11/1985 | Langner | 405/157 |

FOREIGN PATENT DOCUMENTS

1064272 10/1979 Canada .............................. 405/157

Primary Examiner—Cornelius J. Husar
Assistant Examiner—Anthony Knight
Attorney, Agent, or Firm—Dean Sandford; Gregory F. Wirzbicki; June M. Bostich

[57] ABSTRACT

A method for installing a pipeline for transporting a warm fluid, such as newly-produced oil, across arctic seafloor underlain by a permafrost zone without danger of rupture of the pipeline caused by thawing in the supporting permafrost zone comprises (1) drilling a series of boreholes along the seafloor through a thawed zone of subsea soil so as to penetrate a distance into a zone of permafrost lying thereunder, (2) circulating a warm fluid through each borehole so as to cause a zone of prethawing in the permafrost zone and thereby create a slump trough on the surface of the seafloor along a path marked by the series of boreholes; and (3) installing a warm fluid bearing pipeline along the bottom of the slump trough. Usually a temperature differential between the warm fluid and the bottom of the borehole of at least 2 degrees Fahrenheit is required to assure economical prethawing of the permafrost zone.

53 Claims, 4 Drawing Figures

METHOD FOR PREVENTING THAW SETTLEMENT ALONG OFFSHORE ARTIC PIPELINES

BACKGROUND OF THE INVENTION

This invention relates to a pipeline system for transporting warm product, such as newly-produced oil, through frost-susceptible ground or soil. In particular, the invention pertains to a method for reducing or eliminating stress on an offshore pipeline caused by thawing of the underlying zone of permafrost.

In arctic regions a mixture of soil, rock, and ice, which is referred to as permafrost, remains in essentially permanently frozen condition downwardly from a depth a few feet below or near the surface. The layer of surface soil above the permafrost commonly referred to as the "active zone" undergoes alternate thawing and freezing during the warm and cold seasons.

The permafrost layer also extends beneath arctic oceans. At a distance from the shore the zone of permafrost usually lies deeply buried under a layer of soil kept thawed by contact with comparatively warm ocean water. For instance, in 100 feet of water the top of the permafrost zone is about 30 to 80 feet beneath the seafloor. But at distances progressively closer to shore the top of the permafrost zone generally lies at progressively shallower depths until at the shoreline a layer of thawed soil only about five feet in depth covers the permafrost.

Construction to develop petroleum resources beneath the Alaskan Beaufort Sea will require pipelines carrying hot oil to land-based facilities to lie along the seafloor, preferably installed in a trough or depression as protection from damage caused by the keels of ice floes or ridges which plow the sea bottom. Ice-bonded permafrost is known to lie buried beneath the seafloor throughout the area of potential development.

In deep water a pipeline running atop the thick layer of thawed soil does not transmit sufficient heat to thaw the deeply buried underlying permafrost. In the transition zone near the shoreline, however, a warm-oil pipeline installed along the overlying soil will transmit sufficient heat downwardly to reach the shallow-lying permafrost. When ice in the permafrost is thawed, the soil shrinks, undergoing an average decrease in volume of 10 percent, and in ice-rich soil the decrease can be as much as 40 percent. The overlying seafloor slumps correspondingly. As a result the pipeline loses support from beneath and slumps along its length. As pipelines may operate at temperatures as high as 200° F., differential settling of the pipeline due to melting of the underlying permafrost is sufficient to cause sections of the pipeline to sink or shift into attitudes that produce localized curvatures in excess of design tolerances. Rupture and oil spills at sea can result.

A similar problem attends pipelines buried across permafrost terrain. On land, however, certain remedies have been taken to prevent slumping and attendant rupture of the pipelines. For instance, a row of heat pipes can be emplanted along each side of the pipeline as disclosed in U.S. Pat. Nos. 3,217,791 and 4,271,681 to Long and Schertz, respectively. Heat pipes comprised of a sealed pipe containing a quantity of low-boiling point liquid are embedded in the soil with their upper ends extending into the atmosphere. Transfer of heat to the colder atmosphere is effected by the change of state of a low boiling point liquid in the bottom of the pipe which absorbs heat from the surrounding soil and evaporates. Vapors so formed move to the top of the pipe and are condensed by the cooler atmosphere, flowing back as liquid to the bottom of the pipe in a continuous cycle of operation. Heat pipes can keep frozen ground frozen, or can freeze thawed ground without causing frost heave. However, heat pipes are not suitable for installation in the seafloor due to its shifting and inconstant state. Another remedy used on land is to elevate the pipeline so that its warmth is harmlessly dissipated into the atmosphere, as is done with the Trans-Alaskan pipeline. At sea, however, the constant threat of damage from floating ice mandates that the pipeline be placed beneath the level of the seafloor for its security. Yet another remedy used on land is to cover or wrap the buried pipeline in insulation, but insulation only slows the transfer of heat and does not stop it. In time, therefore, thawing will occur.

None of the methods used to prevent melting of the permafrost underlying a buried pipeline on land is suitable for application at sea. What is particularly needed is a method of installing pipelines at sea, particularly pipelines carrying warm fluids such as newly produced oil and gases, so that slumping of the pipeline due to melting of the underlying permafrost is sufficiently minimized that danger of rupture is removed.

SUMMARY OF THE INVENTION

The present invention is directed to a method for installing a warm fluid-bearing pipeline across an arctic seafloor, said method comprising: (1) drilling a series of boreholes along the seafloor through a thawed zone of subsea soil so as to penetrate a distance into a zone of permafrost lying thereunder; (2) circulating a warm fluid through the boreholes so as to create a slump trough on the surface of the seafloor by creating a zone of prethawing in the permafrost zone; and (3) installing a pipeline bearing a warm fluid along the bottom of the slump trough without causing further substantial slumping along the seafloor.

BRIEF DESCRIPTION OF THE DRAWING

The present invention will be more readily understood by reference to the drawing.

DETAILED DESCRIPTION OF THE INVENTION

Figure 1:
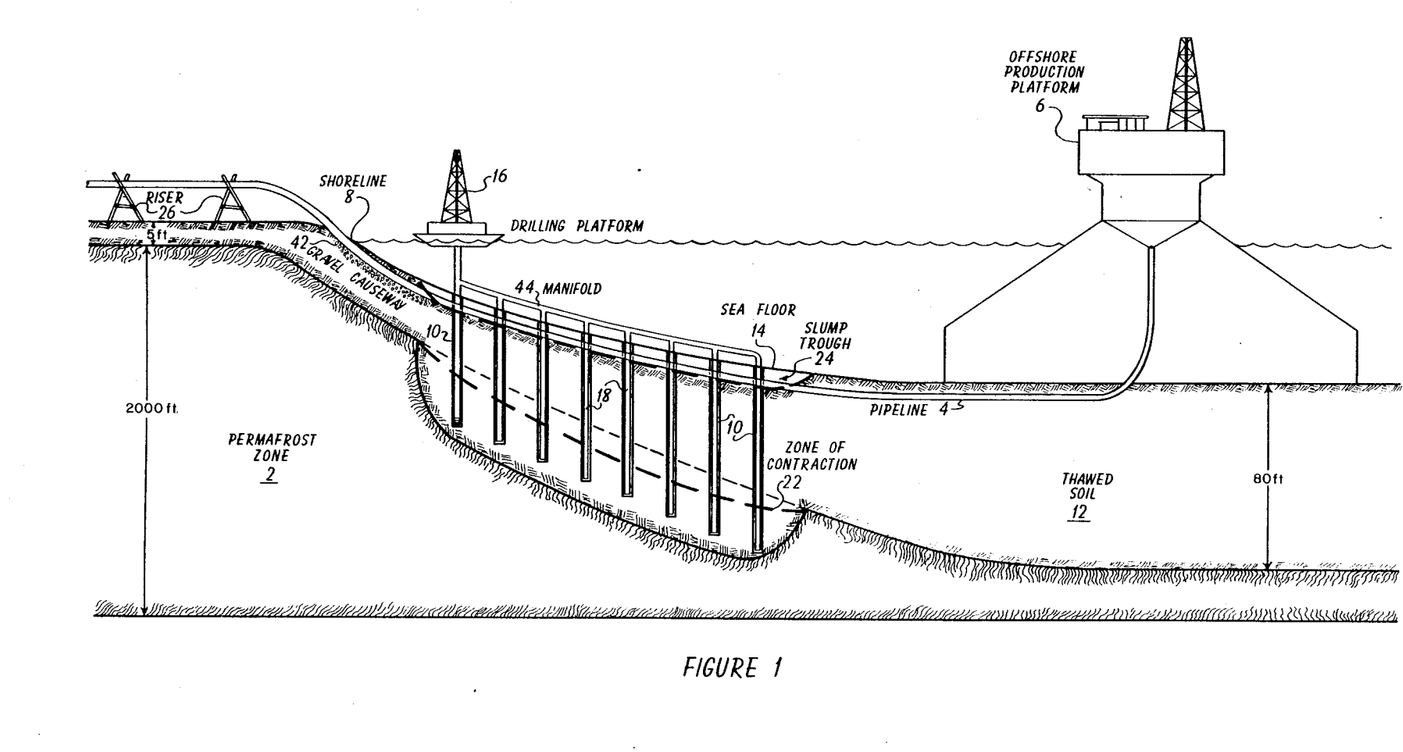
FIG. 1 depicts a vertical cut-away view of an arctic ocean pipeline overlying a zone of permafrost.

With reference now to the drawing, along arctic seafloor 14 underlain by permafrost layer 2 is placed warm-oil pipeline 4, a portion of which lies along slump trough 24 and extends from offshore production platform 6 to shoreline 8. At or near shoreline 8, pipeline 4 rises above ground and continues on land as an elevated pipeline towards a petroleum gathering station (not shown). A series of completed boreholes 10 penetrates the layer of thawed soil or mud 12 underlying seafloor 14, each borehole extending a distance into permafrost zone 2. Circulation of comparatively warm fluid through borehole 10 from drilling platform 16 into permafrost zone 2 thaws a region of permafrost zone 2 within the radius of its thermal influence. Repetition of this practice with each newly drilled borehole creates zone of contraction 22, a thawed zone in the upper regions of permafrost zone 2 along the path of boreholes 10. As permafrost zone 2 thaws, the soil in zone of contraction 22 shrinks in volume by up to 40 percent. A corresponding path of seafloor slumping resulting from contraction in underlying permafrost 2 appears as slump trough 24, a depression running beneath original seafloor 14 immediately overlying zone of contraction 22.

Pipeline 4 is installed along the bottom of slump trough 24 created by this method. If necessary, to ensure protection of pipeline 4 from ice scouring, the depth of slump trough 24 can be increased by excavation before the pipeline is installed. Because the underlying permafrost has been prethawed, heat conducted from warm-oil pipeline 4 to the underlying zone of permafrost 2 causes no further substantial slumping along the length of the pipeline, thereby avoiding rupture and spillage of oil at sea.

More particularly, this invention comprises a method for installing a pipeline 4 carrying warm fluids, such as produced petroleum oils, within a slump trough at least partially created along the seafloor by prethawing a region in the underlying permafrost. Since contraction in permafrost zone 2 occurs before pipeline 4 is installed, heat transmitted from pipeline 4 causes no further substantial slumping along seafloor 14 so that danger of rupturing the pipeline by collapse of the supporting seafloor is thereby eliminated or minimized.

In the practice of this invention, to create slump trough 24, a series of boreholes 10 is made along the route to be followed by a warm fluid carrying pipeline 4. Each borehole penetrates seafloor 14, extends through a layer of mud and soil 12 kept permanently thawed by the comparatively warm overlying seawater, and penetrates a distance into permafrost zone 2. Boreholes 10 are drilled using a small conventional drilling rig so that the diameter of the borehole ranges between about 3 and 12 inches, preferably between about 4 and 8 inches.

Offshore production platforms are often established in water about 150 feet deep or more. The top of permafrost zone 2 generally lies at a depth of between about 80 and 150 feet beneath the Arctic seafloor where the seawater is about 130 feet deep. Consequently, in such deep water heat from production pipelines is absorbed by the layer of thawed soil overlying the permafrost zone and does not reach the deeply buried ice. Therefore, no seafloor slumping and no damage to the pipeline results where the pipeline is covered by about 130 feet or more of water. At such water depths, the production pipeline can be buried beneath the surface of the seafloor at depths sufficient to protect it from ice damage. The maximum known thickness of floating ice is about 150 feet. The keel of an ice floe of this thickness when driven aground in 100 feet of water can gouge out a trough in the seafloor about 20 feet deep. Therefore, the pipeline must be buried at least as deeply as the deepest ice-gouged trough that can be expected, for example, about 20 feet where the water is about 100 feet deep.

But in the zone of transition between the deep ocean and shoreline 8, the top of permafrost zone 2 generally lies at progressively shallower depths as the shoreline approaches and the depth of ice gouging is shallower as well. However, this is not always the case. Permafrost can be found at unexpectedly deep or shallow depths at any point along the route across the transition zone as the result of historic geographic anomalies. Therefore, geophysical soundings are generally employed to determine the exact depth contours of the permafrost zone along the pipeline route, as is explained in greater detail hereafter.

In this transition zone, generally the area between the shoreline and the point at which the water is 150 deep, the thickness of the thawed layer is generally insufficient to protect the underlying permafrost from damage by a warm pipeline installed along the seafloor. It has been discovered that prethawing the permafrost along the route through the transition zone to be followed by the pipeline will prevent settling of the seafloor once the pipeline is installed.

The second major consideration that must be taken into account in the transition zone in positioning the pipeline is the threat of ice gouging. The anticipated depth of maximum ice gouging in the transition zone depends upon the weight of ice floes or ridges found at a given water depth. To determine the actual depth of existing ice gouging along the pipeline route, side scan sonar surveys or other known methods of surveying the seafloor through ice floes can be used. Table 1 displays the general relationship between water depth, the maximum known thickness of ice found at that depth, and the depth of ice gouging that can be expected there as based upon such surveys.

TABLE 1

| Water Depth (feet) | Maximum Ice Thickness (feet) | Maximum Ice Gouging (feet) |
| --- | --- | --- |
| Shoreline to to 5 | 6 | 2 |
| 20 | 25–30 | 5 |
| 50 | 60–65 | 8 |
| 100–150 | 150 | 20 |

Because the weight of wind-driven ice exerts tremendous forces upon a pipeline sufficient to cause rupture, the portion of the pipeline that passes through the transition zone must be protected by positioning the top of the pipeline at a level sufficiently below the original level of the seafloor to protect the pipeline from the deepest ice gouge that can be expected at that point.

In the practice of this invention, the permafrost is pre-thawed by drilling boreholes in the transition zone along the route to be followed by pipeline 4. The depth to which the boreholes are drilled and the region along the seafloor into which they are placed depend upon the distance between seafloor 14 and the top of permafrost zone 2. But where the permafrost underlies more than about 150 feet of water, heat transmitted from pipeline 4 is absorbed by the layer of thawed soil 12 and never reaches permafrost layer 2. Therefore, typically no boreholes are drilled in water deeper than about 150 feet. On the other hand, across that portion of the route nearest the shoreline it may prove more economical than drilling boreholes to support the pipeline by a gravel causeway 42 constructed by dumping sufficient gravel along seafloor 14 to form a substantial bed of support for pipeline 4. The gravel causeway is usually made thick enough to absorb sufficient heat from pipeline 4 that substantially no damage occurs to permafrost zone 2. Typically the point at which it becomes more economical to build a causeway than to drill boreholes extending into the permafrost is at a water depth of between about 3 and 5 feet. However, the causeway can be extended into water depths of about 10 feet if necessary to comply with environmental regulations protecting the shoreline. And in the case of an offshore production platform standing in water no deeper than about 10 feet, the causeway can extend the full distance between the platform and the shoreline.

Alternatively, the gravel causeway can be used as a foundation to support a raised framework or trestle-type riser upon which the pipeline is elevated to allow its heat to dissipate into the atmosphere. Elevating that portion of the pipeline extending along the causeway provides the advantage that any leaks in the pipeline can be detected and repaired. If desired, in this alternative embodiment, the causeway can be made broad enough to build a service road upon it alongside the pipeline.

In yet another embodiment, the series of boreholes 10 can be extended from a point at which the water depth is about 100 feet to shoreline 8, so that pipeline 4 lies protected in slump trough 24 from the most seaward point to which slump trough 24 extends all the way to shoreline 8. At or about shoreline 8, pipeline 4 is usually elevated above groundlevel and supported by a raised framework or trestle-type riser 26 so that heat from the warm fluids contained therein is harmlessly dissipated into the atmosphere without damage to the shallow-lying land based permafrost zone. If desired, where a gravel causeway is used to protect the shoreline, the gravel causeway can extend inland for as far as is economically feasible, usually two miles or more.

Usually boreholes 10 are drilled at intervals of between about 12 and 20 feet, and preferably at intervals of between about 14 and 16 feet, so that the boreholes penetrate into permafrost zone 2 by a distance of between about 10 and 200 feet, preferably between about 20 and 100 feet. However, placement and depth of boreholes 10 in the transition zone are usually primarily determined by two factors—the temperature of the warm fluid to be transported within pipeline 4 and the distance between pipeline 4 and the top of permafrost zone 2. As a guideline it should be noted that for a pipeline carrying primarily petroleum oil at a temperature of about 180° F., the thawing radius, or the radial distance from the center of the pipeline to which sufficient heat is conducted to thaw permafrost 2, is typically between about 50 and 120 feet. However, the amount of heat necessary to thaw the permafrost depends upon the percentage of ice content in the permafrost soil. A high ice content soil will require more heat to thaw than a low ice content soil. Known thermal models can be used to predict the amount of heat that will be transmitted over the life of a warm-oil pipeline and the depth of thawing that amount of heat will cause in a permafrost zone overlain by thawed soil during a projected lifetime of pipeline service.

To determine at what depth permafrost zone 2 lies beneath seafloor 24 at any given location, known geophysical methods using ground penetrating radar or electromagnetic induction are often employed. But preferably to determine the depth of permafrost zone 2 an electrical resistivity log of the path to be followed by the pipeline is made by dragging a logging cable along seafloor 14 following the proposed route of the pipeline.

In the preferred embodiment the boreholes are not drilled to uniform depth across the transition zone but are usually more shallow near the shoreline than in deeper water. The depth of the borehole at each point is calculated by considering two separate factors (1) the depth beneath the seafloor at which the pipeline must lie to escape ice gouging and (2) the depth to which the permafrost must be prethawed to avoid seafloor slumping after the pipeline is installed and put into use.

Using known thermal models, the radius of thermal influence in permafrost over a projected lifetime of pipeline service, or the depth of thawing the heat generated by the pipeline over a lifetime of service would cause in an underlying zone of permafrost at the point where the permafrost lies buried most shallowly is calculated. The shallowest permafrost depth, usually at the shoreline, must be used to calculate this value in order to accomplish satisfactory prethawing along the entire length of the pipeline.

To this depth is added at each point the depth of ice gouging that can be expected at that point. For instance, as set forth above in Table 1, it has been found that in 100 feet of seawater arctic winds supply enough force to drive the keel of an ice ridge about 150 feet thick into the seafloor about 20 feet. On the other hand, at the shoreline where the ice is generally not more than about 6 feet thick, the wind will generally cause an ice gouge trough about 2 feet deep. To avoid damage to the pipeline, therefore, the pipeline is preferably situated in a trough along the seafloor so that its top lies at a level below the original seafloor ranging between 2 feet at the shoreline and about 20 feet in 100 feet of water. Therefore, the depth of anticipated ice gouging at each point is added to the depth of thawing predicted by the thermal model for the point at which the permafrost lies buried most shallowly (usually at the shoreline) to determine the depth of borehole 10 at the point.

Figure 4:
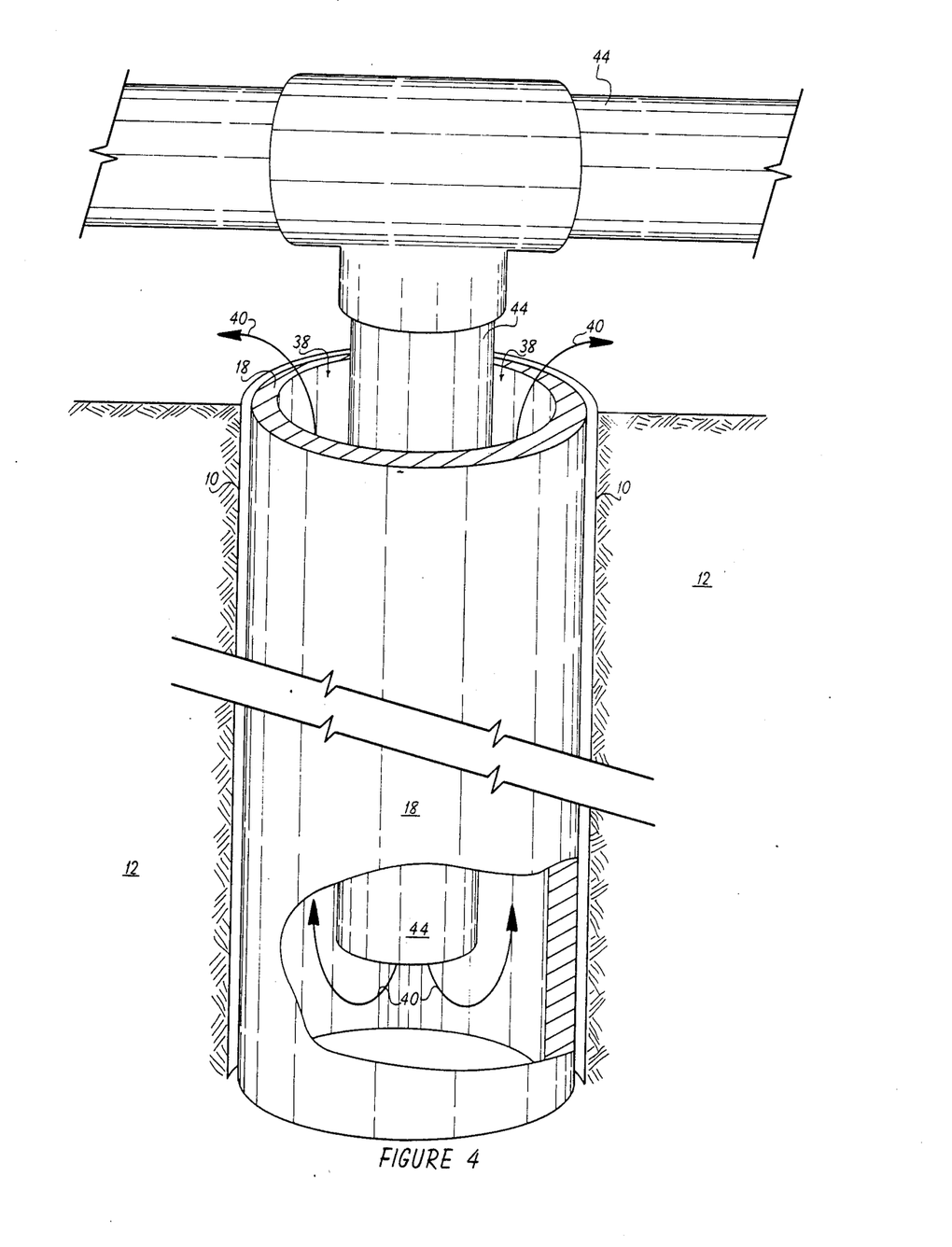
FIG. 4 depicts a vertical cut-away view of a borehole lined with a conduit.

Once the borehole has been drilled into permafrost zone 2, the borehole can either be cased or remain uncased. Preferably, with drilling platform 16 in place, a conduit 18 of smaller diameter than the borehole 10 is placed within the borehole, typically having a diameter between about 1 and 4 inches. And as shown in FIG. 4, warm fluid 40, usually seawater, is circulated down the pipeline 18 through manifold 44 and up the annulus 38 to thaw the surrounding permafrost within the radius of thermal influence generated by the fluid. The rate of thawing can be controlled by adjusting the temperature differential between the circulated warm fluid and the bottom of the borehole. In cold water thawing, a temperature differential of as little as 2 degrees Fahrenheit is needed to accomplish thawing within a reasonable period of time, but a greater temperature differential, for instance about 10 degrees Fahrenheit, will usually result in an increased rate of thawing. Usually during the warm season the temperature of arctic oceans is sufficiently above freezing so that unheated seawater can be circulated into the borehole to thaw the surrounding permafrost. The circulating fluid can, of course, be heated to create a satisfactory temperature differential. The rate of thawing also depends upon the circulation rate of the fluid, a higher rate transmitting a greater amount of heat to thaw the ice. Circulation of the warm fluid can continue for weeks or even for months until permafrost zone 2 has been sufficiently thawed to ensure that heat from a pipeline bearing warm fluids installed near the surface of seafloor 14 will cause substantially no further damage to permafrost zone 2.

To determine that the permafrost has thawed, a temperature sensing device can be lowered to the bottom of the borehole. Temperature readings should be taken when circulation has been temporarily suspended. So long as the temperature of the static fluid in the bottom of the borehole returns to the freezing point, the permafrost remains partially frozen and circulation should be resumed. Repeated temperature readings will determine the point at which no further melting of the permafrost can be economically achieved. Usually this point is reached when the temperature of static fluid in the bottom of the borehole remains above the freezing point. Alternatively, a temperature-sensing device is placed at the top of the borehole. When prethawing is completed, the temperature of the return flow of water from the borehole should approach the temperature of the circulation water entering the borehole. Despite the cold of Arctic winters, the subsea permafrost, once thawed, will not refreeze so long as it stands under at least six feet of water since the permafrost zone is a spontaneously degrading geologic relic.

In the preferred embodiment, a series of uncased boreholes 10 as above described is completed along the path to be followed by the pipeline and into each borehole a conduit 18 of smaller diameter than the borehole is inserted, the boreholes being between about 4 and 8 inches in nominal outside diameter and the conduits being between about 2 to 4 inches in nominal outside diameter. Conduits placed into the boreholes are manifolded together so that warm or heated fluid can be circulated into boreholes through the manifold 44. When temperature readings indicate that satisfactory thawing has been accomplished in each of the boreholes, circulation is stopped and the circulation conduits are withdrawn, allowing the boreholes to collapse behind them if necessary. Removing the circulation conduits assists in forming an uncluttered slump trough 24 into which pipeline 4 can be positioned across seafloor 14. Alternatively, the circulation conduits can be left in place so that after thawing is completed, air can be injected therethrough for air-lift dredging to assist in excavation of the slump trough to increase its depth. After air-lift dredging is completed, the circulation conduits are usually removed.

Figure 3:
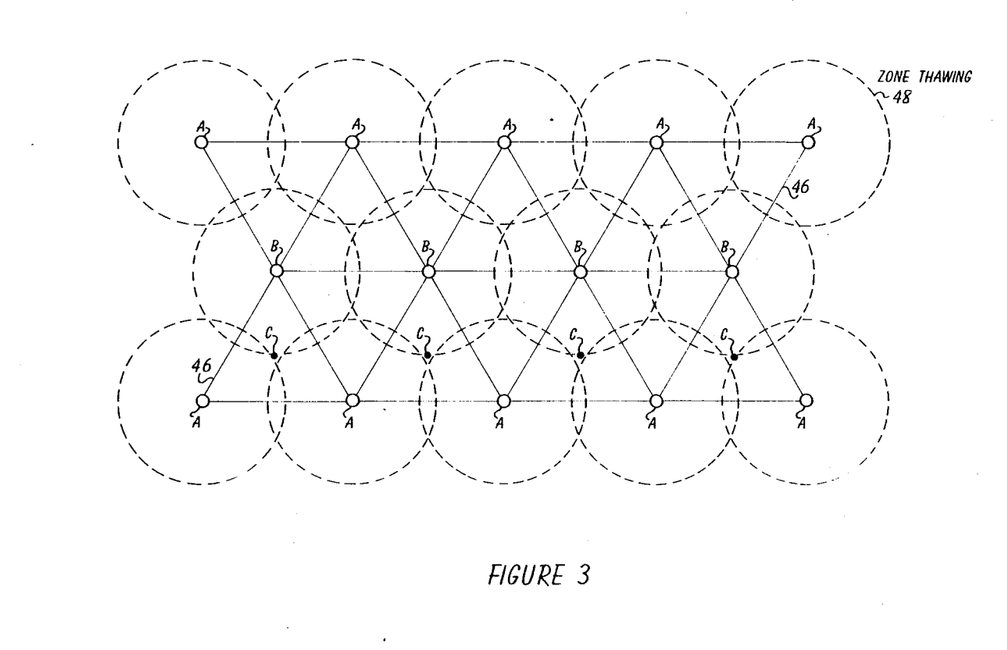
FIG. 3 depicts a pattern of borehole drilling.

In the most preferred embodiment boreholes 10 are drilled in the pattern of a series of equilateral triangles 46 formed by drilling a series of boreholes in Row A spaced between about 7 and 20 feet apart, the distance between the boreholes in the first series forming the base of an equilateral triangle, and a parallel series of boreholes in Row B spaced at the same distance apart as the first series but offset so that each drillhole in Row B is equidistant from the nearest two boreholes in Row A and forms the apex of the equilateral triangle containing the nearest two boreholes in Row A as its base. At the center of each of the triangles so formed, a temperature-measuring borehole is drilled, forming a third row of boreholes, Row C, whose sole purpose is to provide a means for monitoring the progress of the prethawing operations in the boreholes located at the angles of the surrounding equilateral triangle without the need to stop circulation of the warm fluid used in prethawing.

If it is desired to increase the width of the slump trough, parallel rows of boreholes can be repeated keeping the above-described spacings in the pattern ACBCA to form a network of equilateral triangles as wide as desired.

The temperature-measuring boreholes in Row C can be of any sized diameter suitable for suspending a temperature sensing device therein so that temperature at the bottom of the borehole can be readily monitored, usually between about 4 and 8 inches in diameter. The boreholes in Rows A and B are between 4 and 8 inches and contain steel conduits therein having a diameter between 2 and 4 inches as described above.

During prethawing operations the zone of thawing 48 surrounding each borehole in Rows A and B will expand approximately radially until the zones of thawing for the three boreholes surrounding each temperature-measuring borehole in Row C converge at the temperature-measuring borehole. When this point in the prethawing progress has been reached, the temperature in the bottom of the temperature-measuring borehole will rise comparatively rapidly. Heat from the warm circulation fluid will no longer be needed to supply the change of state heat for transition from ice to water, but will instead raise the temperature of the water in the soil surrounding the boreholes. Since the heat required for change of state from ice to water is close to 143.5 British thermal units per pound of water, while only 1 British thermal unit will raise the temperature of one pound of water by 1 degree Fahrenheit, a sudden rise in temperature at the bottom of the temperature-sensing borehole will signal that prethawing of the permafrost has been accomplished. The sudden rise in temperature will, of course, be no greater than the temperature differential between the warm fluid at the top of the borehole and the thawed permafrost at the bottom of the borehole.

The advantages of using a triangular drilling pattern for boreholes is twofold. First, a broader slump trough is created on the seafloor than is created if a single series of boreholes is drilled. A broader slump trough is desirable, for instance, when the thermal model used to predict the radius of thermal influence of the warm pipeline indicates that an unusually wide slump trough would result after installation of the pipeline if no prethawing of the permafrost were done. Second, the temperature-sensing boreholes made possible by the triangular drilling pattern dispose of the need to have periodic shutdown of circulation fluids to determine when prethawing has been accomplished. Shutdown is costly both in terms of time and of money.

Figure 2:
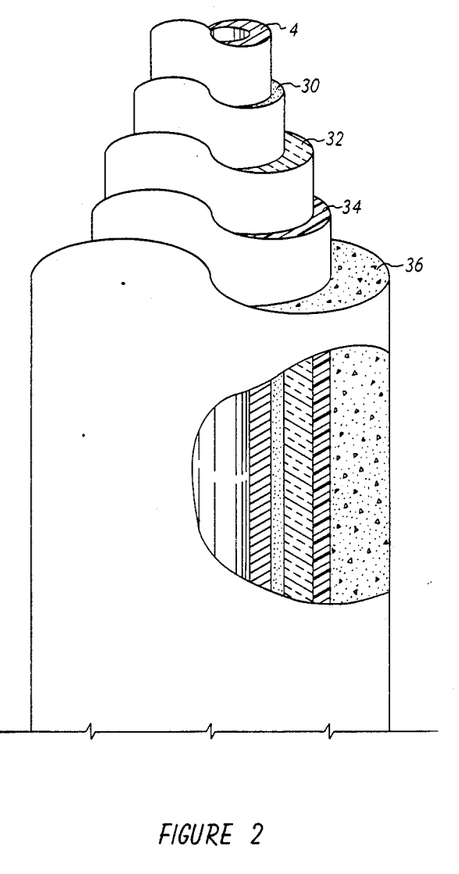
FIG. 2 depicts a vertical cut-away view of a pipline covered with layers of insulating and corrosion-proof materials.

Typically, the warm-oil pipeline 4 as shown in FIG. 2 will consist of a steel conduit insulated to protect against the arctic cold and corrosion caused by seawater. In the preferred embodiment, the steel conduit has an outside diameter of between about 10 and 36 inches. The outside of the steel conduit is protected and insulated with multilayered coatings. Usually successive layers are applied comprising a coating 30 against the steel of epoxy or extruded polyethylene for corrosion protection; a layer 32 of plastic insulating foam such as polyurethane, polystyrene, or syntactic foam containing hollow glass spheres for protection against heat loss; a waterproof coating 34 such as a polyethylene or a reinforced, thermosetting resin to protect the plastic layer against degradation by seawater; and, if deemed necessary, a coating 36 containing weighting matter, such as portland cement concrete containing steel reinforcing bars, to prevent the oil-bearing pipeline from floating in seawater.

The pipeline is usually installed at the bottom of the uncovered slump trough, relying upon the depth of the trough to protect the pipeline from damage by ice keels. Alternatively, the slump trough can be excavated to increase its depth and/or once the pipeline is installed therein, a covering of soil or other matter as protection against ice gouging can be put in place.

The particular advantage in the practice of this invention is that contraction of the permafrost zone occurs before the pipeline bearing warm fluids is installed so that heat from the installed pipeline works no substantial further damage upon the permafrost. As a result the installed pipeline is not subjected to intensive thaw strains and the danger of rupture at sea is minimized.

The invention is further illustrated by the following example:

EXAMPLE 1

An offshore production platform stands in about 103 feet of water in the Beaufort Sea off the coast of northern Alaska. Produced oil and gas at a temperature of about 160° F. is to be pumped to a land-based processing station situated about 8 miles from the shoreline via a subsea pipeline.

Measurements of the depth beneath the seafloor at which the permafrost lies are taken by dragging an electrical resistivity logging cable manufactured by Harding-Lawson Associates along the route the pipeline is to follow. From the electrical resistivity log, a determination is made of the total depth beneath the seafloor at which the permafrost zone lies along the pipeline route.

In addition, a thermal model is used to determine that a projected flowrate of 250,000 barrels per day of petroleum products passing through the insulated pipeline at a temperature of 160° F. will generate enough heat to thaw an underlying zone of permafrost to a depth of 40 feet as calculated at the shoreline. It is further determined that maximum ice gouging along the seafloor at the points where the permafrost lies 50 feet below the seafloor and at the shoreline is 15 and 4 feet, respectively.

Borehole depths along the pipeline route between these points are calculated by adding 40 feet to the anticipated depth of ice gouging at each point. Using a conventional drilling rig, boreholes having a diameter of 6 inches are spaced along the route at 15 foot intervals. A steel conduit of 2-inch nominal outside diameter is placed within each borehole and connected to a single manifold. A down-hole temperature sensing device is positioned within each borehole and the temperature therein is recorded. The mean temperature in the bottom of the borehole is 29° F. Through the manifold, seawater at a temperature of 34° F. is circulated into each borehole for 58 days. After the 38th day, circulation is stopped every 10 days to take temperature readings in the bottom of each borehole. Circulation is continued until it is determined that when circulation has been stopped for 30 minutes, the temperature of the fluid in the bottom of the borehole remains above freezing.

After circulation has been stopped, the circulation conduits are removed and the slump trough created by thawing in the underlying permafrost zone is dredged out by pulling an underwater dredge along its length so as to assure that the top of the pipeline will be no higher than the maximum depth to which ice gouging is expected at each point along the route as determined by side scan sonar surveys.

At the shoreward end of the slump trough, gravel is dumped along the seafloor following the proposed route for the pipeline to create a gravel causeway for supporting the pipeline between the shoreward end of the slump trough and the shoreline. On shore a trestle-type riser having a height of 7 feet is installed to elevate the pipeline above ground across the 8-mile inland portion of its route to a petroleum gathering station.

The pipeline consists of a 24 inch outside diameter steel pipe covered with successive layers of insulating and corrosion-proof materials comprising a coating of PRITEC® extruded polyolefin, manufactured by Bredero-Price Incorporated, Houston, Tex.; a 4-inch layer of polyurethane foam manufactured by Polymer Development Laboratories, Inc., Orange, Calif.; a waterproof coating of polyethylene; and a 3-inch coating of portland cement concrete containing steel reinforcing wire as a weighting material to keep the pipeline from floating when filled with petroleum products.

Once the slump trough, gravel causeway and trestle-type riser have been prepared, the pipeline is installed. As it departs from the production platform, the pipeline is buried at a depth equal to the depth of the slump trough at its most seaward end as protection against ice floes which impact against the sides of the production platform. Between the shoreward and seaward ends of the slump trough, the pipeline lies uncovered by soil along the bottom of the slump trough. Then between the shoreward end of the slump trough and the shoreline, the pipeline lies along the gravel causeway emerging from the causeway at the shoreline and continuing elevated atop the trestle-type riser to the petroleum gathering station.

While particular embodiments of the invention have been described, it will be understood that the invention is not limited thereto since many obvious modifications can be made. It is intended to include within this invention any such modification as will fall within the scope of the appended claims.

I claim:

1. A method for installing a warm fluid-bearing pipeline across an arctic seafloor, said method comprising:
   (1) drilling a series of boreholes along the seafloor through a thawed zone of subsea soil so as to penetrate a distance into a zone of permafrost lying thereunder;
   (2) circulating a warm circulation fluid through the boreholes so as to create a slump trough on the surface of the seafloor by creating a prethawing zone in the permafrost zone; and
   (3) installing a pipeline bearing a warm fluid along the bottom of the slump trough without causing further substantial slumping along the seafloor.

2. The method of claim 1 wherein prior to circulation in step (2) the temperature difference between the warm fluid and the bottom of the borehole is at least 2 degrees Fahrenheit.

3. The method of claim 2 wherein the warm fluid is seawater.

4. The method of claim 2 wherein the warm fluid is heated to establish the 2 degree or greater Fahrenheit temperature difference.

5. The method of claim 2 wherein the boreholes are spaced at intervals of between about 12 and 20 feet.

6. The method of claim 1 wherein the temperature of the circulation fluid remains above freezing when circulation is stopped.

7. The method of claim 1 wherein the series of boreholes extends across a region of the seafloor from the seashore to the point at which the thermal influence of the pipeline if buried at sufficient depth to avoid damage by ice gouging would not reach the unthawed permafrost zone.

8. The method of claim 7 wherein a gravel causeway supports the pipeline between the shoreline and the most shoreward end of the slump trough.

9. The method of claim 1 wherein the series of boreholes extends across a region of the seafloor wherein the depth of seawater ranges between about 10 and 150 feet and a gravel causeway supports the pipeline between the shoreline and the most shoreward end of the slump trough.

10. The method of claim 1 wherein the slump trough created in step (2) is excavated to a depth sufficient to protect the pipeline installed in step (3) against damage by ice.

11. The method of claim 1 wherein the boreholes are drilled to a depth of between about 10 and 200 feet from the level of the seafloor.

12. The method of claim 1 wherein the boreholes are drilled to a depth of between about 20 and 100 feet from the level of the seafloor.

13. The method of claim 1 wherein the diameter of the boreholes is between about 3 and 12 inches.

14. The method of claim 1 wherein the diameter of the boreholes is between about 4 and 8 inches.

15. The method of claim 14 wherein a conduit having a diameter between about 1 and 4 inches is placed within each borehole to conduct the warm circulation fluid.

16. The method of claim 15 wherein each of the conduits is connected to a manifold so that the warm fluid circulates into the series of boreholes through the manifold.

17. The method of claim 1 wherein the pipeline comprises a metal conduit covered with successive layers of insulation and corrosion-proof materials comprising (1) a coating of corrosion-proof material, (2) a plastic insulating foam selected from the group consisting of polyurethane, polystyrene, and syntactic foam containing hollow glass spheres, (3) a waterproof coating, and (4) a coating containing a weighting matter.

18. A method for installing a warm fluid-bearing pipeline across an arctic seafloor, said method comprising:
   (1) drilling at least one series of equally spaced boreholes along the seafloor through a thawed zone of subsea soil so as to penetrate a distance into a zone of permafrost lying thereunder;
   (2) circulating a warm fluid through each borehole so as to thaw the region of permafrost surrounding the borehole;
   (3) prethawing the permafrost zone by the circulation of fluids in step (2) so as to create a substantially continuous slump trough upon the seafloor along a path marked by the boreholes extending across a portion of the seafloor wherein the zone of thermal influence of a warm fluid-bearing pipeline installed along the seafloor would penetrate the top of an unprethawed permafrost zone;
   (4) installing a warm fluid-bearing pipeline along the bottom of the slump trough created in step (3); and
   (5) passing warm fluid through said pipeline without causing further substantial slumping along the seafloor so as to protect the pipeline from ice gouging.

19. The method of claim 18 wherein prior to circulation in step (2) the temperature difference between the warm fluid and the bottom of the borehole is at least 2 degrees Fahrenheit.

20. The method of claim 19 wherein the warm fluid is heated to establish a 10 degrees Fahrenheit temperature difference.

21. The method of claim 19 wherein the boreholes are spaced at intervals of between about 12 and 20 feet.

22. The method of claim 18 wherein circulation of fluid through each borehole is continued until the temperature of the circulation fluid remains above freezing when circulation has been stopped.

23. The method of claim 18 wherein the series of boreholes extends across the seafloor from a point of about 150 feet of seawater to the shoreline and the pipeline lies along the bottom of the slump trough created by circulation of the warm fluid through the boreholes.

24. The method of claim 18 wherein on land the pipeline is sufficiently elevated above ground level by a support to dissipate heat into the atmosphere without damage to the permafrost zone.

25. The method of claim 18 wherein the slump trough created in step (2) is excavated to a depth sufficient to protect the pipeline installed in step (3) against damage by ice floes in the arctic sea.

26. The method of claim 18 wherein the boreholes are drilled to a depth of between about 10 and 200 feet from the level of the seafloor.

27. The method of claim 18 wherein the boreholes are drilled at least as deeply as the depth to which sufficient heat would penetrate to cause thawing in the underlying unprethawed permafrost zone from a pipeline buried so as to avoid ice gouging.

28. The method of claim 18 wherein the diameter of the boreholes is between about 3 and 12 inches.

29. The method of claim 18 wherein the diameter of the boreholes is between about 4 and 8 inches.

30. The method of claim 29 wherein a conduit having a diameter between about 2 and 4 inches is placed within each borehole to conduct the warm circulation fluid.

31. The method of claim 30 wherein each of the conduits is connected to a manifold so that the warm fluid circulates into the series of boreholes through the manifold.

32. The method of claim 18 wherein the pipeline comprises a metal conduit covered with successive layers of insulation and corrosion-proof materials comprising (1) a coating of corrosion proof material selected from the group consisting of an epoxy resin and extruded polyethylene, (2) a plastic insulating foam selected from the group consisting of polyurethane, polystyrene, and syntactic foam containing hollow glass spheres, and (3) a waterproof coating selected from the group consisting of a reinforced, thermosetting resin and polyethylene.

33. The method of claim 32 wherein the layers coating the pipeline further comprise an outside layer of coating containing a weighting material.

34. A method for installing a pipeline across arctic subsea terrain carrying warm petroleum products from an offshore production platform to an onshore petroleum processing station without danger of rupture in the pipeline caused by thawing in a supporting zone of permafrost, said method comprising:
   (1) drilling a series of boreholes along the seafloor through a thawed zone of subsea soil so as to penetrate a distance into a zone of permafrost lying thereunder;
   (2) installing within each borehole a conduit having a smaller diameter than the diameter of the borehole;

(3) circulating a warm fluid through each conduit, said fluid passing downwardly through the conduit and upwardly through the annular space between the conduit and the side of the borehole so as to partially prethaw the surrounding zone of permafrost and thereby create a substantially continuous slump trough on the seafloor along a path marked by the series of boreholes;

(4) excavating the slump trough so as to increase its depth sufficiently that the top of a pipeline installed therein lies below the level of ice gouging in the surrounding subsea terrain;

(5) installing a pipeline along the bottom of the slump trough so as to connect the offshore production platform with the onshore petroleum gathering station; and (6) flowing warm oil through the pipeline without substantial further thawing of the underlying zone of permafrost.

35. The method of claim 34 wherein the temperature difference between the warm fluid and the fluid in the bottom of the borehole is at least 2 degrees Fahrenheit.

36. The method of claim 35 wherein the warm fluid is seawater.

37. The method of claim 35 wherein the warm fluid is heated to establish a 10 degrees Fahrenheit temperature difference.

38. The method of claim 35 wherein the boreholes are spaced at intervals of between about 14 and 16 feet and circulation through the boreholes continues until temperature of the circulation fluid at the bottom of the borehole remains constant when circulation has been stopped.

39. The method of claim 35 wherein the boreholes are spaced at intervals of between about 12 and 20 feet and circulation is continued until the circulation water entering the borehole is about the same temperature as the water leaving the borehole.

40. The method of claim 38 wherein the diameter of the boreholes is between about 4 and 8 inches and the diameter of the conduits installed therein is between about 2 and 4 inches.

41. The method of claim 38 wherein the series of boreholes extends across a region of the seafloor wherein the depth of seawater ranges between about 3 and 150 feet and the boreholes are drilled to a depth of between 20 and 100 feet from the level of the seafloor.

42. The method of claim 41 wherein a gravel causeway supports the pipeline from the most shoreward end of the slump trough to a point on land at least as far as the shoreline.

43. The method of claim 38 wherein the conduits are connected to a manifold and the warm fluid circulates via the manifold downwardly through the conduit and upwardly through the annular space between each borehole and the conduit installed therein.

44. The method of claim 38 wherein the pipeline comprises a metal conduit covered with successive layers of insulation and corrosion-proof materials comprising (1) a coating of corrosion-proof material selected from the group consisting of an epoxy resin and extruded polyethylene, (2) a plastic insulating foam selected from the group consisting of polyurethane, polystyrene, and syntactic foam containing hollow glass spheres, (3) a waterproof coating selected from the group consisting of a reinforced, thermosetting resin and polyethylene.

45. A method for installing a warm fluid-bearing pipeline across an arctic seafloor, said method comprising:

(1) drilling a first series of equally spaced boreholes along the seafloor through a thawed zone of subsea soil so as to penetrate a distance into a zone of permafrost lying thereunder;

(2) drilling a second series of equally spaced boreholes along the seafloor through a thawed zone of subsea soil so as to penetrate a distance into a zone of permafrost lying thereunder, the boreholes of the second series being positioned so as to form the apex of an equilateral triangle having a base defined by two boreholes in the first series of boreholes;

(3) drilling a third series of equally spaced boreholes positioned so that each borehole lies substantially at the center of one of the equilateral triangles formed by the boreholes drilled in steps (1) and (2) above, a temperature-sensing device being positioned along each borehole in the third series;

(4) circulating a warm fluid through each borehole in the first and second series of boreholes so as to thaw the region of permafrost surrounding the borehole and so as to form a substantially continuous slump trough upon the seafloor along a path marked by the boreholes and extending across a portion of the seafloor wherein the zone of thermal influence of a warm fluid-bearing pipeline installed along the seafloor would penetrate the top of the permafrost zone, the slump trough being substantially equivalent to the slump trough that would result if the warm fluid-bearing pipeline were installed along the seafloor at a depth sufficient to protect the pipeline from ice gouging;

(5) ceasing circulation of the warm fluid when the temperature along the boreholes of the third series of boreholes undergoes a relatively rapid elevation; and (6) installing the warm fluid-bearing pipeline along the bottom of the slump trough so as to protect the pipeline from ice gouging.

46. The method of claim 45 wherein prior to circulation in step (4) the temperature difference between the warm fluid and the bottom of the boreholes is at least 2 degrees Fahrenheit.

47. The method of claim 46 wherein the warm fluid is heated to establish the temperature difference.

48. The method of claim 46 wherein the boreholes in the first and second series are spaced between about 12 and 20 feet apart.

49. The method of claim 45 wherein the boreholes extend across the seafloor from a point of about 150 feet of seawater to the shoreline and the pipeline lies along the bottom of the slump trough created by circulation of the warm fluid through the boreholes.

50. The method of claim 49 wherein on land the pipeline is sufficiently elevated above ground level by a support to dissipate heat into the atmosphere without damage to the permafrost.

51. The method of claim 45 wherein the diameter of the boreholes is between about 4 and 8 inches.

52. The method of claim 50 wherein a conduit having a diameter between about 2 and 4 inches is placed within each borehole in the first and second series to conduct the warm circulation fluid.

53. A method for installing a warm fluid-bearing pipeline across an arctic seafloor, said method comprising:

(1) drilling a plurality of boreholes along the seafloor through a thawed zone of subsea soil so as to penetrate a distance into a zone of permafrost lying thereunder;
(2) circulating a warm fluid through at least some of said boreholes so as to create a slump trough on the surface of the seafloor by creating a prethawing zone in the permafrost zone; and
(3) installing a pipeline bearing a warm fluid along the bottom of the slump trough without causing further substantial slumping along the seafloor.

* * * * *